US010219015B2

(12) United States Patent
Kokenos et al.

(10) Patent No.: US 10,219,015 B2
(45) Date of Patent: Feb. 26, 2019

(54) OFFERING ITEMS IDENTIFIED IN A MEDIA STREAM

(71) Applicant: Amazon Technologies, Inc., Reno, NV (US)

(72) Inventors: Danae M. Kokenos, Seattle, WA (US); Charles Porter Schermerhorn, Seattle, WA (US); Matthew T. Tavis, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 189 days.

(21) Appl. No.: 14/098,241

(22) Filed: Dec. 5, 2013

(65) Prior Publication Data
US 2014/0109118 A1 Apr. 17, 2014

Related U.S. Application Data

(63) Continuation of application No. 12/683,737, filed on Jan. 7, 2010, now Pat. No. 8,627,379.

(51) Int. Cl.
H04N 5/445 (2011.01)
H04N 21/2543 (2011.01)
(Continued)

(52) U.S. Cl.
CPC ......... H04N 21/2543 (2013.01); G06Q 30/02 (2013.01); G06Q 30/06 (2013.01); H04N 21/47815 (2013.01); H04N 21/812 (2013.01)

(58) Field of Classification Search
CPC ....... H04N 21/44008; H04N 21/47815; H04N 21/4725
See application file for complete search history.

(56) References Cited

U.S. PATENT DOCUMENTS 5,249,044 A 9/1993 Von Kohorn
5,721,583 A * 2/1998 Harada .............. H04N 7/17354
348/E7.075
(Continued)

FOREIGN PATENT DOCUMENTS

CN 1214837 4/1999
CN 101305611 11/2008
(Continued)

OTHER PUBLICATIONS

The European Office Action dated Mar. 11, 2015 for European patent application No. 10842750.1, a counterpart foreign application of U.S. Appl. No. 12/683,737, 5 pages.
(Continued)

Primary Examiner — Pankaj Kumar
Assistant Examiner — Timothy R Newlin
(74) Attorney, Agent, or Firm — Lee & Hayes, P.C.

(57) ABSTRACT

Disclosed are techniques to enable users to perform transactions such as purchasing items or receiving information regarding items depicted within a content stream, where the content stream may be received from a content provider and provided to an output device. Transactions may be performed by a user that may or may not be associated with a content provider or associated with an item offering service. In one example, a content stream may be analyzed to detect a depiction of an item, and a user may operate a user interface overlaid onto the displayed content stream to perform transactions such as initiating a purchase or requesting more information on the detected items.

19 Claims, 10 Drawing Sheets

(51) Int. Cl.
*G06Q 30/02* (2012.01)
*G06Q 30/06* (2012.01)
*H04N 21/478* (2011.01)
*H04N 21/81* (2011.01)

(56) References Cited

U.S. PATENT DOCUMENTS

| | | | |
|---|---|---|---|
| 5,872,588 A | 2/1999 | Aras et al. | |
| 5,880,769 A | 3/1999 | Nemirofsky et al. | |
| 5,929,849 A | 7/1999 | Kikinis | |
| 5,978,013 A * | 11/1999 | Jones | G06Q 20/387 348/465 |
| 6,282,713 B1 * | 8/2001 | Kitsukawa | G06Q 30/02 348/E5.105 |
| 6,438,751 B1 | 8/2002 | Voyticky et al. | |
| 6,490,725 B2 * | 12/2002 | Kikinis | G06F 13/4004 348/E5.008 |
| 7,001,279 B1 * | 2/2006 | Barber | H04N 5/44513 348/E7.061 |
| 7,058,963 B2 | 6/2006 | Kendall et al. | |
| 7,150,028 B1 | 12/2006 | Ranta | |
| 7,158,676 B1 * | 1/2007 | Rainsford | H04N 7/17318 348/700 |
| 7,231,651 B2 | 6/2007 | Pong | |
| 7,237,252 B2 * | 6/2007 | Billmaier | G06F 1/3203 348/E5.006 |
| 7,269,837 B1 | 9/2007 | Redling et al. | |
| 7,346,917 B2 * | 3/2008 | Gatto | G06Q 30/06 348/E5.004 |
| 7,383,209 B2 | 6/2008 | Hudetz et al. | |
| 7,555,503 B1 | 6/2009 | Neal et al. | |
| 7,577,979 B2 | 8/2009 | Feinleib et al. | |
| 7,793,316 B2 | 9/2010 | Mears et al. | |
| 7,856,644 B2 | 12/2010 | Nicholson et al. | |
| 8,068,781 B2 | 11/2011 | Ilan et al. | |
| 8,160,840 B2 | 4/2012 | Caruso et al. | |
| 8,213,916 B1 * | 7/2012 | Yankovich | H04L 65/602 345/173 |
| 8,601,504 B2 | 12/2013 | Stone et al. | |
| 9,071,730 B2 | 6/2015 | Livesey | |
| 2001/0021916 A1 * | 9/2001 | Takai | G06Q 30/0257 725/60 |
| 2001/0023436 A1 | 9/2001 | Srinivasan et al. | |
| 2001/0052133 A1 * | 12/2001 | Pack | G06Q 30/02 725/109 |
| 2001/0056350 A1 * | 12/2001 | Calderone | G06Q 20/102 704/270 |
| 2002/0056091 A1 * | 5/2002 | Bala | G06Q 30/02 725/34 |
| 2002/0065741 A1 * | 5/2002 | Baum | G03D 15/005 705/26.5 |
| 2002/0104090 A1 * | 8/2002 | Stettner | H04N 5/4401 725/60 |
| 2002/0120934 A1 * | 8/2002 | Abrahams | G06Q 30/06 725/60 |
| 2002/0120935 A1 * | 8/2002 | Huber | G06Q 30/06 725/60 |
| 2002/0174444 A1 * | 11/2002 | Gatto | G06Q 30/06 725/133 |
| 2003/0101104 A1 * | 5/2003 | Dimitrova | G06F 17/30787 705/27.1 |
| 2003/0182658 A1 * | 9/2003 | Alexander | G06Q 30/0633 725/60 |
| 2004/0010806 A1 | 1/2004 | Yuen et al. | |
| 2004/0117839 A1 * | 6/2004 | Watson | H04L 29/06027 725/87 |
| 2004/0125125 A1 | 7/2004 | Levy | |
| 2004/0249726 A1 * | 12/2004 | Linehan | G06Q 20/0855 705/26.8 |
| 2005/0098628 A1 | 5/2005 | Hashimoto et al. | |
| 2005/0120391 A1 * | 6/2005 | Haynie | H04H 60/07 725/135 |
| 2006/0064757 A1 * | 3/2006 | Poslinski | H04N 5/76 726/26 |
| 2006/0150218 A1 * | 7/2006 | Lazar | G06Q 30/02 725/60 |
| 2006/0273893 A1 * | 12/2006 | Warner | G08B 25/006 340/531 |
| 2007/0030385 A1 | 2/2007 | Crawford et al. | |
| 2007/0039020 A1 | 2/2007 | Cansler, Jr. et al. | |
| 2007/0061845 A1 * | 3/2007 | Barnes, Jr. | G06Q 30/0601 725/62 |
| 2007/0079335 A1 * | 4/2007 | McDonough | H04N 7/17309 725/58 |
| 2007/0124769 A1 * | 5/2007 | Casey | H04H 20/10 725/46 |
| 2007/0150360 A1 | 6/2007 | Getz | |
| 2008/0021786 A1 | 1/2008 | Stenberg et al. | |
| 2008/0052226 A1 * | 2/2008 | Agarwal | G06F 17/277 705/39 |
| 2008/0098425 A1 * | 4/2008 | Welch | H04N 5/44513 725/37 |
| 2008/0109841 A1 * | 5/2008 | Heather | G06Q 30/02 725/32 |
| 2008/0155637 A1 * | 6/2008 | Du Breuil | H04N 7/17318 725/134 |
| 2008/0255961 A1 * | 10/2008 | Livesey | G06Q 30/02 705/26.8 |
| 2008/0281689 A1 | 11/2008 | Blinnikka et al. | |
| 2008/0304747 A1 | 12/2008 | Marinkovich et al. | |
| 2008/0319852 A1 | 12/2008 | Gardner et al. | |
| 2009/0077459 A1 * | 3/2009 | Morris | H04N 5/44508 715/201 |
| 2009/0116702 A1 * | 5/2009 | Conradt | G06K 9/00711 382/118 |
| 2009/0123025 A1 | 5/2009 | Deng et al. | |
| 2009/0125559 A1 | 5/2009 | Yoshino | |
| 2009/0150330 A1 * | 6/2009 | Gobeyn | G06Q 30/0269 |
| 2009/0172751 A1 | 7/2009 | Aldrey et al. | |
| 2009/0193463 A1 | 7/2009 | Choi et al. | |
| 2009/0276805 A1 * | 11/2009 | Andrews, II | G06Q 30/02 725/35 |
| 2010/0060802 A1 * | 3/2010 | Huegel | H04N 21/4722 348/734 |
| 2010/0175080 A1 * | 7/2010 | Yuen | G09F 27/00 725/32 |
| 2011/0078001 A1 | 3/2011 | Archer et al. | |
| 2011/0093884 A1 | 4/2011 | Wachtfogel et al. | |
| 2011/0135283 A1 | 6/2011 | Poniatowki et al. | |
| 2011/0167456 A1 * | 7/2011 | Kokenos | G06Q 30/02 725/60 |
| 2011/0225604 A1 | 9/2011 | Bova | |
| 2011/0289535 A1 * | 11/2011 | Saffari | H04N 21/235 725/61 |
| 2012/0066708 A1 * | 3/2012 | Lee | G06Q 30/02 725/31 |
| 2012/0167145 A1 * | 6/2012 | Incorvia | H04N 21/4725 725/60 |
| 2014/0282674 A1 | 9/2014 | Conradt et al. | |

FOREIGN PATENT DOCUMENTS

| | | |
|---|---|---|
| CN | 101529770 | 9/2009 |
| EP | 0672993 | 9/1995 |
| JP | 2002108668 | 4/2002 |
| JP | 2002373277 | 12/2002 |
| JP | 200367589 | 3/2003 |
| JP | 2005503598 A | 2/2005 |
| JP | 2005148780 | 6/2005 |
| JP | 2005184624 | 7/2005 |
| JP | 2006031200 | 2/2006 |
| JP | 2007336168 | 12/2007 |
| JP | 2008210274 | 9/2008 |
| JP | 2008271196 | 11/2008 |
| JP | 2009295011 | 12/2009 |
| KR | 1020000012813 | 3/2000 |
| KR | 100928354 | 11/2009 |
| WO | WO2011044270 | 4/2011 |

(56) References Cited

FOREIGN PATENT DOCUMENTS

OTHER PUBLICATIONS

Translated Japanese Office Action dated Jul. 28, 2015 for Japanese patent application No. 2012-548037, counterpart foreign application of U.S. Appl. No. 12/683,737, 6 pages.
Translated Japanese Office Action dated Dec. 2, 2014 for Japanese patent application No. 2012-548037, a counterpart foreign application of U.S. Appl. No. 12/683,737, 7 pages.
Office Action for U.S. Appl. No. 12/732,963, dated Dec. 8, 2014, Danae M. Kokenos, "Identifying Items in a Content Stream," 15 pages.
Office action for U.S. Appl. No. 12/732,963, dated Aug. 14, 2014, Kokenos, "Identifying Items in a Content Stream", 17 pages.
U.S. Appl. No. 12/683,737, filed Jan. 7, 2010, Kokenos, et al., "Offering Items Identified in a Media Stream".
U.S. Appl. No. 12/732,963, filed Mar. 26, 2010, Kokenos, "Identifying Items in a Content Stream".
Ad-ID Advertising Identification and Management, Advertising Digital Identification, LLC, Copyright 2002-2003, Retrieved on Feb. 24, 2010 at <<https://www.ad-id.org/>> and <<https://www.ad-id.org/help/help_detailNEW.cfm>>, 2 pgs.
The EP Search Report dated Mar. 14, 2011 for PCT Application No. PCT/US10/61984, a counterpart application of U.S. Appl. No. 12/683,737.
The Extended European Search Report dated Jul. 9, 2013 for European patent application No. 10842750.1, 6 pages.
Google Googles Labs, Retrieved on Feb. 24, 2010 at <<http://www.google.com/mobile/goggles/#landmark>>, 1 pg.
Office action for U.S. Appl. No. 12/732,963, dated Nov. 9, 2012, Kokenos, "Identifying Items in a Content Stream", 12 pages.
Office action for U.S. Appl. No. 12/683,737, dated Apr. 22, 2013, Kokenos et al., "Offering Items Identified in a Media Stream", 18 pages.
Non-Final Office Action for U.S. Appl. No. 12/732,963, dated Apr. 30, 2012, Danae M. Kokenos et al., "Identifying Items in a Content Stream", 11 pages.
Office action for U.S. Appl. No. 12/683,737, dated Sep. 14, 2012, Kokenos et al., "Offering Items Identified in a Media Stream", 18 pages.

OpenCable, CableLabs, Retrieved on Feb. 24, 2010 at <<http://www.cablelabs.com/opencable/>>, 1 pg.
The Chinese Office Action dated Apr. 3, 2015 for Chinese patent application No. 201080065280.4, a foreign counterpart application of U.S. Appl. No. 12/683,737, 9 pages.
The Canadian Office Action dated Nov. 16, 2015 for Canadian Patent Application No. 2786587, a counterpart foreign application of U.S. Pat. No. 8,627,379, 4 pages.
Translated Chinese Office Action dated Nov. 26, 2015 for CN patent application No. 201080065280.4, a counterpart foreign application of U.S. Pat. No. 8,627,379, 7 pages.
Office Action for U.S. Appl. No. 12/732,963 dated Sep. 15, 2015, Kokenos, "Identifying Items in a Content Stream", 16 pages.
EPO Result of Consultation for European patent application No. 10842750.1, a counterpart foreign application of U.S. Pat. No. 8,627,379, dated May 27, 2016, 9 pages.
Office action for U.S. Appl. No. 12/732,963, dated Jun. 1, 2016, Kokenos, "Identifying Items in a Content Stream", 16 pages.
The Canadian Office Action dated Nov. 2, 2016 for Canadian patent application No. 2786587, a counterpart foreign application of U.S. Pat. No. 8,627,379, 3 pages.
Translated Korean Office Action dated Oct. 21, 2016 for Korean Patent Application No. 10-2012-7020605, a counterpart foreign application of U.S. Pat. No. 8,627,379, 18 pages.
Translated Japanese Office Action dated May 23, 2017 for Japanese patent application No. 2016-091672, a counterpart foreign application of U.S. Pat. No. 8,627,379, 10 pages.
Translated Japanse Office Action dated Feb. 27, 2018 for Japanese patent application No. 2016-091672, a counterpart foreign application of U.S. Pat. No. 8,627,379, 12 pages.
The Summons to Attend Oral Proceedings dated Feb. 8, 2016 for European patent application No. 10842750.1, a counterpart foreign application of U.S. Pat. No. 8,627,379, 5 pages.
Translated Japanese Notice of Allowance dated Mar. 29, 2016 for Japanese Patent Application No. 2012-548037, a counterpart foreign application of U.S. Pat. No. 8,627,379, 6 pages.
The Canadian Office Action dated Sep. 1, 2017 for Canadian patent application No. 2786587, a counterpart foreitgn application of U.S. Pat. No. 8,627,379, 6 pages.
The Indian Office Action dated Dec. 18, 2018 for Indian Patent Application No. 5981/DELNP/2012, a counterpart of U.S. Pat. No. 8,627,379, 7 pages.

* cited by examiner

OFFERING ITEMS IDENTIFIED IN A MEDIA STREAM

RELATED APPLICATIONS

The present application is a continuation of and claims priority to U.S. application Ser. No. 12/683,737, filed on Jan. 7, 2010, entitled "Offering Items Identified in a Media Stream," now U.S. Pat. No. 8,627,379, which is incorporated by reference herein in its entirety.

BACKGROUND

While watching a video stream such as broadcast television, users view scores of advertisements for an array of different products offered for sale by an array of different merchants. However, if one of these users desires to purchase an offered product, the user must typically either go to a brick-and-mortar store that offers the desired product or use a computer that is entirely disconnected from the television to order the desired product over the Internet. For instance, after watching an advertisement for a particular pair of shoes, the user may either travel to a local merchant that offers the shoes or may order the shoes from a merchant using a desktop or laptop computer of the user. However, both of these two options require the user to direct his or her attention away from the object currently of interest—namely the television stream that is currently being broadcasted to the television of the user.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
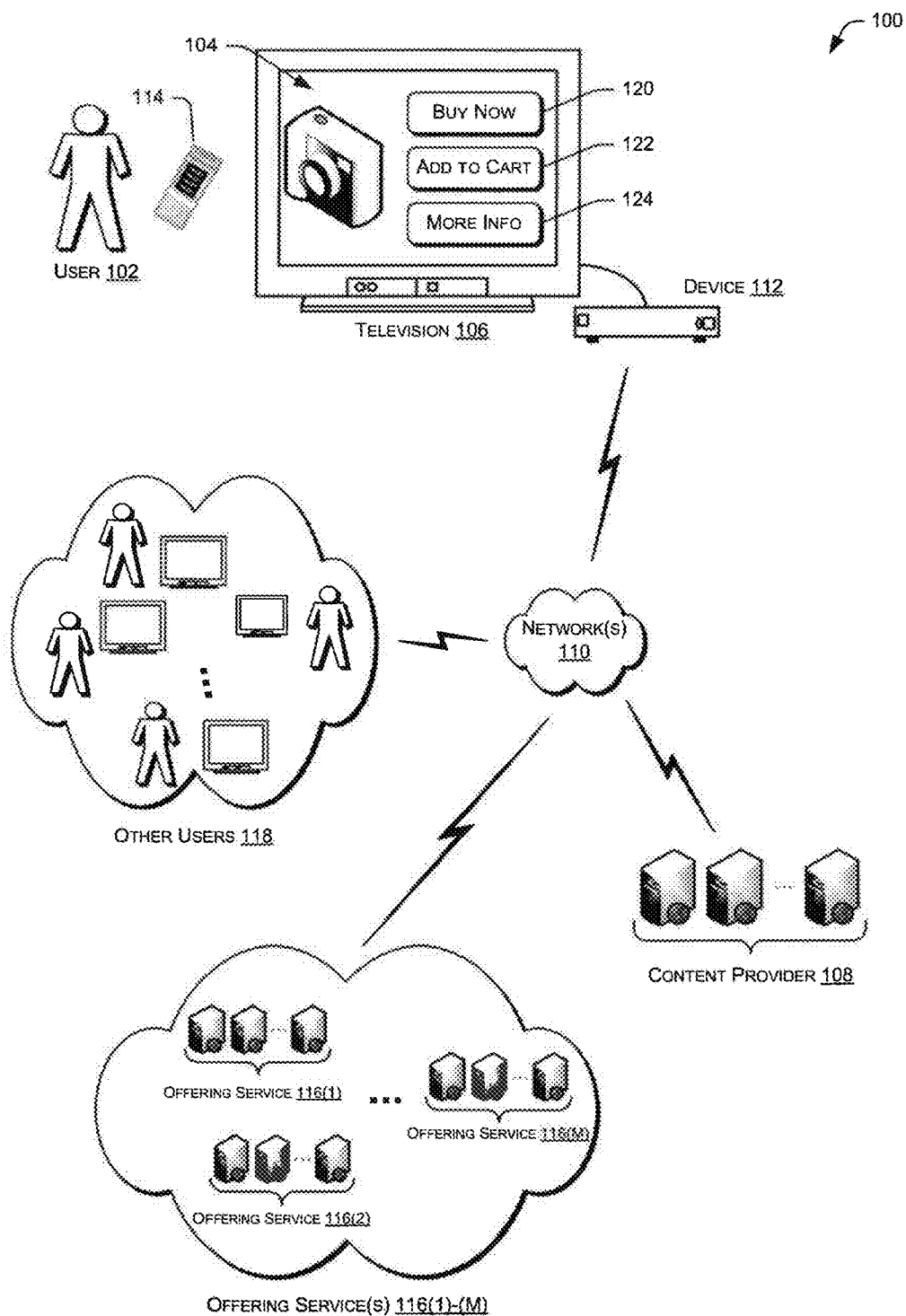
FIG. 1 illustrates an example architecture that includes a user watching a video stream on a television. As illustrated, the television couples to a device that monitors the video stream displayed on the television. Within this architecture, the user may, for example, request to purchase or receive information regarding an item displayed on the television, regardless of whether the device or the television has been previously associated with the user making the request.

This disclosure is directed, in part, to techniques to enable users take advantage of offers identified within a media stream. For instance, the techniques may allow the users to obtain (e.g., purchase, rent, lease, download, etc.) items or receive information regarding items identified in media stream being output by a content output device. The content output device may comprise a personal computing device, a television, a radio, a heads up display, a kiosk or any other device capable of outputting any sort of content. In addition, the stream output by the content output device may comprise a video stream, an audio stream or any other form of media stream. These techniques apply regardless of whether the users are previously associated with the content output device or with a device that monitors the stream output by the content output device.

With these techniques, in one example, a user watching a video stream displayed on a television may see an advertisement for an item offered for purchase. In response, the user may choose to initiate a purchase of the item from an item offering service, to add the item to a shopping cart of the user at the item offering service, or receive information regarding the item from the item offering service.

To do so, the user may send the request, via a remote control or otherwise, to a device, such as a set-top box, that monitors the video stream being displayed by the television. In response to receiving the request, the device may facilitate entry of an identifier of the user. The user may then enter an email address of the user, a mobile phone number of the user, a name of the user or any other information that allows the item offering service to uniquely identify the user.

After receiving the user's identifier, the device may send the identifier along with an identifier of the item to the item offering service to initiate the request, such as the request to purchase the item. In some instances discussed below, the device may also send a message authentication code (MAC) (e.g., a Hash-based MAC) or the like for the purpose of enabling the item offering service to verify the authenticity of the received message.

The item offering service may receive the user identifier, the item identifier and, potentially, the MAC. After verifying the authenticity of the message, the item offering service may map the received user identifier to a user account for the purpose of identifying the user. The service may also map the item identifier to an electronic catalog of items for the purpose of identifying the item, unless the device such as the set-top box has already done so.

After identifying the item, the service may analyze the user account to determine how the user prefers to approve purchases at the item offering service, as well as the contact information that the service may use to contact the user. For instance, the service may determine that the user prefers to receive an email in order to approve requested purchases. Conversely, the service may determine that the user prefers to receive short messaging service (SMS) or multimedia messaging service (MMS) text messages. In still other instances, the service may send a communication to the user based on the user identifier received. For example, the item offering service may send an email if the user provided an email address, may send an SMS text message if the user sent a mobile phone number, and the like.

In either instance, the service may send a request to approve the purchase of the item to a user. In some instances, the service sends this message to the user via a communication channel that differs from a communication channel by which the user entered the user identifiers and by which the item offering service received the user and item identifiers. For instance, the service may receive the user and item identifiers from the device that monitors the video stream via a private connection between the device and the service, while sending an email or an SMS text message to the user to approve the purchase.

In each of these instances, the user may receive a request to approve the purchase of the item from the item offering service. The user may then approve or deny the approval request and may provide this approval or denial back to the item offering service. Because the service sent this request via a communication channel that differs from how the user inputted the request to initiate the purchase, the user does not approve or deny the approval request via the television, but via another computing device. For instance, the user may send an approval to the item offering service via an SMS text message in instances where the service sent the approval request to the user via an SMS text message.

With use of these techniques, users are able to send requests to one or more item offering services to purchase items, add items to shopping carts, receive information about items, or the like, while watching a video stream on a computing device or a television (e.g., while watching broadcast television, a locally-stored movie, navigating an electronic program guide (EPG), playing a game, etc.), while listening to an audio stream on a radio or while consuming any other media stream by any other content output device. Furthermore, after sending the requests, the users are able to receive approval requests from the item offering service(s) via a mobile phone of the user, a laptop computing device of the user or any other electronic device other than the televisions through which the users inputted the initial requests. Furthermore, these users are able to receive the requested item or information via these other channels as well. For instance, a user may receive requested information about an item via an email after making the request for the information through the device coupled to the television.

In still other instances, a user may request to purchase an item identified in stream, such as a video stream, and provide, as a part of this request, both a user identifier and a personal identification number (PIN) or other password associated with the account of the user at the item offering service. Then, the device coupled to the content output device may send this request with the user identifier and the PIN to the item offering service, which may actually process the request on behalf of the identified user if the PIN matches a PIN stored by the item offering system in association with an account of the identified user. That is, the item offering service may approve the request to purchase an item in response to receiving a request from the device that is accompanied with a user identifier and a PIN that is associated with the user identifier at the item offering service.

Furthermore, because these techniques enable users to enter user identifiers before providing these identifiers to an item offering service, these techniques allow multiple different users to send requests through a common device and/or content output device. That is, if multiple users are watching a common video stream, each of these users is able to request to purchase or otherwise take an action regarding an item displayed on the television, for example, before consummating the transaction with the item offering service over communication channels that are unique to the individual users.

For instance, a first user may request to purchase a new pair shoes by entering a mobile phone number of the user into the device coupled to a content output device, such as a television. After receiving the identifier of the shoes and the email address of the user, the item offering service may then send an email to the entered address to allow the user to approve or deny the purchase. A second user, meanwhile, may see an advertisement for a particular book for sale and, in response, may request more information regarding the advertised book. The user may enter a mobile phone number of the user into the device coupled to the television and, after receiving the user and item identifiers, the item offering service may send an SMS or MMS text message to the entered mobile phone number containing additional information about the advertised book.

The discussion begins with a section entitled "Illustrative Architecture" that describes one example architecture and several example components that implement the techniques introduced above. Next, a section entitled "Illustrative User Interfaces" follows, describing examples of user interfaces (UIs) that may be served to and rendered at the television of the user of FIG. 1 after the user requests to purchase an item displayed on the television, add an item to a shopping cart of the user or request information regarding an item. The discussion then moves on to discuss an "Illustrative Flow Diagram" for implementing the described techniques in the architecture of FIG. 1, before concluding with a section entitled "Illustrative Processes" and a brief conclusion.

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many. For instance, and as discussed above, these techniques apply to a variety of content output devices and for a variety of media streams, including audio streams, video streams and any other form of media stream.

Illustrative Architecture

FIG. 1 illustrates an example architecture 100 in which a user 102 may leverage the techniques described above while consuming a stream being output by a content output device. Here, user 102 is viewing a video stream on a display 104 of a television 106. As illustrated, a content provider 108 provides the displayed video stream over a network 110, which may include any one or combination of multiple different types of networks, such as cable networks, the Internet, and wireless networks. In some instances, network 110 comprises a cable network, a satellite network or any other network that provides a television broadcast signal, an audio stream, video-on-demand or any other video or audio signal.

Content provider 108 may comprise a cable television provider, a satellite television provider or any other type of provider capable of providing a video stream to television 106. In some instances, a device 112 coupled to television 106 receives and causes display of the video stream on the television. In these and other instances, device 112 monitors the video stream to detect when items are shown on display 104, as introduced above and described in detail below. Although illustrated as separate from television 106, this device may also be integral with television 106 in other implementations. Furthermore, device 112 may comprise a set-top box, a game console, a media center or any other computing device that receives the video signal and causes display of the received signal on display 104 or any other device that otherwise monitors the incoming video stream.

FIG. 1 further illustrates that user 102 may use a remote control 114 or other input device to operate television 106 and/or device 112. For instance, user 102 may use remote control 114 to control contents of the displayed video stream (i.e., to change the channel), to control a volume of television 106, to adjust settings of television 106 or the like. Furthermore, remote control 114 may include controls that, when actuated by user 102, cause display of an overlay on display 104. This overlay may allow user 102 to request to purchase an item currently or previously displayed on display 104, may allow user 102 to request to add the item to a shopping cart or list (e.g., a wish list) associated with the user, may allow user 102 to request information regarding the item or may allow user 102 to take any other action regarding the item.

As introduced briefly above, device 112 receives these requests from user 102 and passes the requests to one or more offering services 116(1), 116(2), . . . , 116(M). In response to receiving these requests, the receiving offering services (e.g., service 116(M)) contacts user 102 for the purpose of fulfilling the request. FIG. 1 further illustrates that multiple other users 118 may also operate respective devices coupled to respective televisions for the purpose of making these requests to the same or different offering services 116(1)-(M).

FIG. 1, for instance, illustrates that display 104 currently displays an image of a digital camera. Device 112, which monitors the video stream displayed on display 104, detects that the digital camera may comprise an item offered for consumption (e.g., purchase, rental, lease, etc.) by one or more of offering services 116(1)-(M). The device may make such a determination by detecting an advertisement and determining the items being marketed therein, or the device may simply detect the item within the video stream, regardless of whether the item resides within an advertisement. In either event, device 112 detects that display 104 currently displays a particular identified item, namely a digital camera in this example.

Device 112 may implement one or more of a variety of techniques to identify the items within the audio and/or video stream. In the latter example, the device may implement image recognition technology to analyze the visually-displayed item and attempt to match the identified characteristics against a catalog of items. In addition or in the alternative, the device may request that a group of human users manually identify the items. For audio streams, the device may employ audio recognition techniques to identify item characteristics and compare these characteristics against the catalog of items. Again, the device may also request that a group of human users manually identify these items within the audio stream. However the device identifies the item, the techniques may employ a feedback loop to ask for user feedback regarding the identified item. By doing so, the device may continually improve its ability to correctly recognize items within a stream.

In response to identifying an item and in response to receiving a request from user 102 (e.g., via remote control 114), device 112 causes display of one or more icons on display 104 that enable user 102 to make specific request regarding the displayed item. For instance, FIG. 1 illustrates that device 112 may display an icon 120 entitled "Buy Now," an icon 122 entitled "Add to Cart," and an icon 124 entitled "More Info." In addition or in the alternative, device 112 may compile each item identified within a particular program, movie, song or other stream. Then, device 112 may provide a list of the identified items to the user at the conclusion of the program for the user's browsing and perusal. For instance, the user may be able to receive information and/or request to purchase one or more items that were displayed within a particular episode of a television program, within a particular movie, or the like.

With this information displayed, user 102 may again operate remote control 114 (or any other control associated with device 112) to select one of icons 120, 122, and 124. For instance, when user 102 desires to purchase the illustrated digital camera, user 102 may select icon 120 to initiate a purchase of the camera from example offering service 116(M). In response to selecting icon 120, device 112 may facilitate entry of an identifier associated with user 102 or another user. For instance, device 112 may display a text box that allows user 102 to enter (e.g., via remote control 114, via a keyboard, via a touch screen, audibly (via a microphone), etc.) a piece of information that uniquely identifies user 102 with offering service 116(M) and/or device 112. For instance, user 102 may enter his or her name, a mobile phone number of the user, an email address of the user, a user name of the user at offering service 116(M) or any other identifier.

In some instances, user 102 may enter a transaction phrase token as an identifier. As described in U.S. patent application Ser. No. 11/548,111 (incorporated by reference above), a transaction phrase token comprises a set of numeric or alphanumeric characters that may have a secondary meaning to the user (e.g., "Camera Wizard," "Grace's Textbooks," "Tanner's Allowance," "Rambling Trail Runner," etc.). Furthermore, in some instances, each of the phrases may comprise at least one word. In still other instances, each of the phrases may comprise between two and seven words, and may be free of numbers, symbols and the like. As such, these phrases may comprise a number of grammatically-correct words that may or may not be separated from one another by a space.

In some instances, a user may request creation of a transaction phrase token for the user's own use. That is, the user may link his or her payment instrument to a phrase token, such as "Camera Wizard," and may then use the transaction phrase token to purchase or otherwise consume services or items. In other instances, a first user may request creation of a token that is for use by a second user. For instance, a father may create a transaction phrase token for his son, Griffin, entitled "Griffin's Utility Bills." The father may then set rules about how Griffin may and may not use the transaction phrase token. For instance, the father could set a monthly allowance for the transaction phrase token or could specify that the token may only be used to pay for utility bills from specific vendors (and, hence, cannot be used to purchase other services or items).

In both instances, a user of a created transaction phrase token may use the phrase token to conduct transactions (e.g., to purchase or otherwise consume services or items offered for sale or consumption). For instance, the user could purchase, give, or receive a service or item (e.g., an item from a merchant, money, etc.) with the use of the transaction phrase token, or the user could similarly engage in any other sort of transaction with use of the token.

In some instances, a transaction phrase token that is associated with an aspect of a user account is free from information identifying the aspect of the user account. For instance, the transaction phrase token "Camera Wizard" may be associated with a payment instrument of user 102, yet may be free from information identifying the payment instrument. Therefore, the user associated with the phrase may more freely share the phrase than an actual identifier of the payment instrument. That is, user 102 may more freely share the phrase "Camera Wizard" when compared with the sharing of the underlying payment instrument (e.g., a credit card number, bank account number, gift card number, etc.).

In addition to being associated with one or more aspects of a user account (e.g., payment instrument, shipping address, etc.), a transaction phrase token may have other characteristics. For instance, a transaction phrase token may be assigned one or more rules specifying how the token may be used. For instance, user 102 may assign rules to his or her phrase token "Camera Wizard," specifying that offering service 116(M) is to automatically approve any purchase requests for digital camera items that are less than $100, and that these items are to be shipped via 2-day shipping. User 102 may similarly create any other similar or different rules.

Regardless of the identifier used, device 112 may send the user's entered identifier along with an identifier of the item (here, a digital camera) to offering service 116(M). In some instances, device 112 also sends a message authentication code (MAC) for the purpose of enabling offering service 116(M) to authenticate the message.

In response to receiving the message from device 112, offering service 116(M) may map the user identifier to a particular user and/or user account at the service. Service 116(M) may also map the item identifier to a particular item within an electronic catalog of items hosted by the service. The offering service 116(M) may also analyze the identified user account to determine a communication preference of the user. Conversely, the service may simply use the received user identifier to determine how to contact user 102 regarding the user's request to purchase the illustrated camera. In addition, offering service 116(M) may determine a payment instrument against which to charge the item, as well as a shipping address and ship speed that is to be associated with the order for the camera. Conversely, the service may instead request that user 102 specify this information in a communication to the user.

After determining some or all of this information, offering service 116(M) may then send a request to approve the purchase to user 102. In alternative instances, offering service 116(M) may automatically complete the purchase for the user if the user's account dictates. The service may then send a confirmation of the purchase rather than a request to approve the purchase. In each of these instances, service 116(M) may send an email, a short messaging service (SMS) text message, a multimedia messaging service (MMS) text message, an interactive voice response (IVR) communication, a phone call, a message to a web-accessible user account of user 102, or any other similar or different type of communication to user 102. In some instances, offering service 116(M) sends this message via a communication channel that differs from the communication channel by which user 102 inputted the information and by which device 112 sent the information to offering service 116(M). This approval request may simply include a request to approve or deny the purchase, or may also request additional information, such as a preferred payment instrument, shipping address and/or shipping method.

After receiving this approval request (e.g., via an SMS text message), user 102 may respond to offering service 116(M). In response to receiving an approval of the purchase, offering service 116(M) may proceed to finalize the purchase and fulfill the request for the digital camera. Conversely, the offering service may refrain from completing the purchase in response to receiving a denial of the purchase from user 102.

As discussed above, by allowing user 102 to enter a user identifier on an overlay of a video stream displayed on television 106, the user 102 and other users are able to purchase items advertised or otherwise shown on broadcast television, movies or the like without having to first associate device 112 with an account of the user at offering service 116(M). That is, potentially any user who is watching the video stream on display 104 may request to purchase a displayed item. In addition, multiple users may each request to purchase same or different items from the same television and via common device 112. Furthermore, by separating the initiating of the transaction with the approval of the transaction, users are able to initiate a purchase while watching the video stream and finalize the purchase at a later time. In instances where these users have a business relationship with offering service 116(M) (e.g., when the users maintain a user account at the service), the users do not have to provide payment details to a party that the users may or may not trust. Instead, these users are able to finalize this transaction with a party that already maintains trust of the users.

Figure 2:
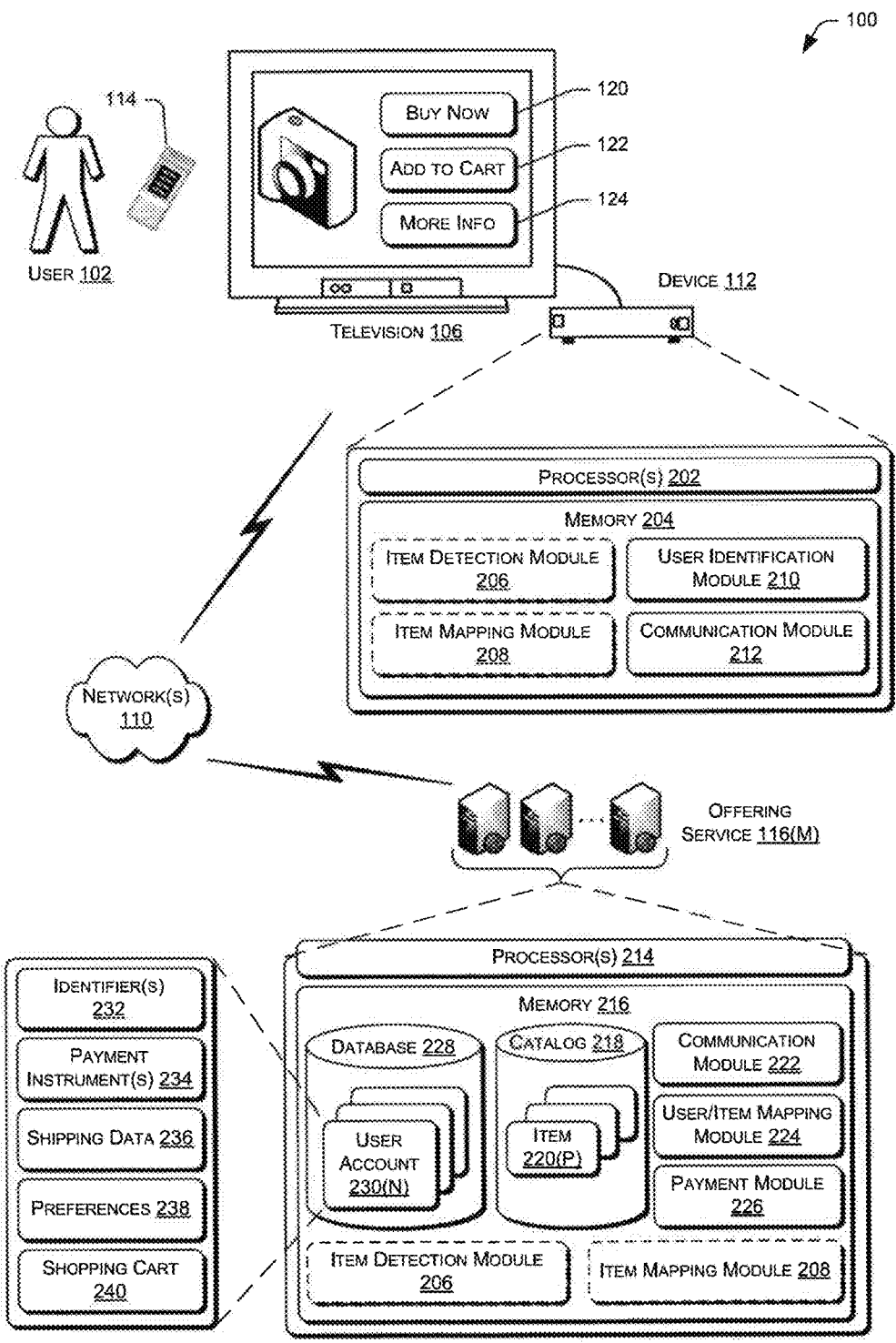
FIG. 2 illustrates example components of the device coupled to the television of FIG. 1, as well as example components of an item offering service of FIG. 1 that offers the item or information about the item displayed on the television.

FIG. 2 illustrates example components of device 112 coupled to television 106 of FIG. 1, as well as example components of item offering service 116(M) that offers the item or information about the item displayed on the television.

As illustrated, device 112 may include one or more processors 202 and memory 204. Memory 204 stores or otherwise has access to an item detection module 206, an item mapping module 208, a user identification module 210 and a communication module 212. Device 112 may include one or more other non-illustrated modules in some implementations.

Item detection module 206 serves to monitor the video stream being displayed on display 104 of television 106 for the purpose of identifying an item displayed within the stream. In some instances, module 206 monitors the stream to determine if the video stream displays an item that is included in one or more specified electronic catalogs, such as an electronic catalog hosted by offering service 116(M). Monitoring the stream may include both monitoring visual aspects of the displayed stream as well as metadata that accompany the video stream. In some instances, item detection module 206 identifies advertisements within the stream (e.g., video, audio, etc.) in order to identify one or more displayed items (e.g., with reference to tags in the metadata), while in other instances the module may identify items within the stream regardless of whether the item appears in a designated advertisement. As illustrated, item detection module 206 may reside on device 112 and/or on offering service 116(M).

In order to verify that a displayed object is indeed an item, item detection module 206 may communicate with item mapping module 208. Item mapping module 208 may receive candidate items from item detection module 206 and may attempt to map these items into one or more specified electronic catalogs for the purpose of verifying whether the object is indeed an item within the catalog, as well as the exact identity of the item. Once module 208 determines that an object is indeed an item, item mapping module 208 may determine an identifier associated with the item, such as a title of the item, a stock-keeping unit (SKU) of the item, a universal product code (UPC) of the item and the like. As illustrated, item mapping module 208 may reside on device 112 and/or on offering service 116(M).

In addition, item mapping module 208 may identify one or more accessory items that are related to the identified item for the purpose of offering these accessories to the user at a later time. Additionally or alternatively, module 208 may identify similar items that having higher reviews or additional functionality for later offering of these "up sell" items to the user.

Next, user identification module 210 enables user 102 (or any other user viewing the video stream on display 104) to enter an identifier associated with the user for the purpose of taking some action regarding a displayed item. For instance, when user 102 makes a request to initiate a purchase of the displayed digital camera, user identification module 210 facilitates entry of an identifier associated with the user. For instance, module 210 may present a text box to allow user 102 to enter his or her name, email address, mobile phone number, transaction phrase token, etc. Conversely, module 210 may enable user 102 to orally state an identifier or may enable user 102 to input such an identifier in any other similar or different manner.

Once device 112 has received a request from user 102, has identified the item associated with the request and has received an identification of user 102, communication module 212 may communicate this information to one or more of offering services 116(1)-(M). Specifically, communication module 212 may send a message that includes the determined item identifier, the entered user identifier and, potentially, a message authentication code (MAC) or the like that allows the receiving offering service(s) to validate the authenticity of the message.

In some instances, communication module 212 sends this message to a particular merchant that offers multiple different items regardless of the identity of the particular item. In other instances, communication module 212 uses the identity of the displayed item to determine which of the offering services 116(1)-(M) to which to send the message. For instance, in the illustrated example, module 212 may send the message to a manufacturer of the camera or to a merchant that is providing the advertisement. Similarly, communication module 212 may send the message to multiple different merchants that offer the item.

In the illustrated example, communication module 212 sends the message to offering service 116(M). As illustrated in FIG. 2, service 116(M) includes one or more processors 214 and memory 216, which stores or otherwise has access to an electronic catalog 218 that includes information about multiple items 220(1), 220(2), . . . , 220(P), such as the illustrated digital camera. An item can include a product, a service, a digital download, a news clip, customer-created content, information, or some other type of sellable or non-sellable unit. The stored information, meanwhile, may include item identifying information (e.g., SKUs, UPCs, titles, etc.), availability information, price information, rating information, or any other similar or different information.

Offering service 116(M) also stores or otherwise has access to a communication module 222, a user/item mapping module 224 and a payment module 226. Communication module 222 receives the message from the communication module of device 112 and also functions to contact user 102 in response to the receiving of the message, as described in detail below. To contact the user associated with the request, mapping module 224 maps the received user identifier to a database 228 that stores individual user accounts 230(1), 230(2), . . . , 230(N). As illustrated, example user account 230(N) stores one or more identifiers 232 of a user associated with the account, one or more payment instruments 234 associated with the user and the account, shipping data 236 associated with the user and the account and, potentially, preferences 238 associated with the user and the account. User account 230(N) may also store a shopping cart that includes items that are stored by the user for potential later purchase by the user.

Mapping module 224 may compare the received user identifier to identifiers 232 stored within user accounts 2301(1)-(N) in order to identify user 102 that sent the request via device 112. Next, mapping module 224 may consult preferences 238 of the user account of user 102 to determine how user 102 prefers to communicate with offering service 116(M). For instance, preferences 238 may dictate that communication module 222 should send an email to a particular email address of user 102 in response to receiving a request to initiate purchase of an item via device 112. In other instances, the received identifier of the user may dictate how communication module 222 communicates with user 102, with or without reference to preferences 238. For instance, if user 102 initially inputs a mobile phone number, then communication module 222 may communicate with the user via the received number.

Next, user/item mapping module 224 may map the received item identifier against electronic catalog 218 to identify the referenced item (here, the illustrated digital camera). After making this determination, the communication module 222 sends a message to identified user 102 regarding the identified digital camera and, potentially, regarding identified accessory and/or up sell items related to the identified digital camera. Here, because user 102 originally requested to initiate a purchase of the camera in the given example, this message comprises a request to approve purchase of the camera (for the determined cost of the camera) using one of payment instruments 234 and shipping data 236 (e.g., shipping address, shipping method and ship speed). This message is typically sent via a communication channel that differs from how user 102 originally input the request and from how device 112 sent the request to offering service 116(M). User 102 may then send an approval or a denial of the request to approve the purchase. In the former instances, offering service 116(M) may fulfill the request via payment module 226 by charging the specified payment instrument and delivering the item to user 102. In the latter instances, offering service 116(M) may cancel the transaction.

Figure 3:
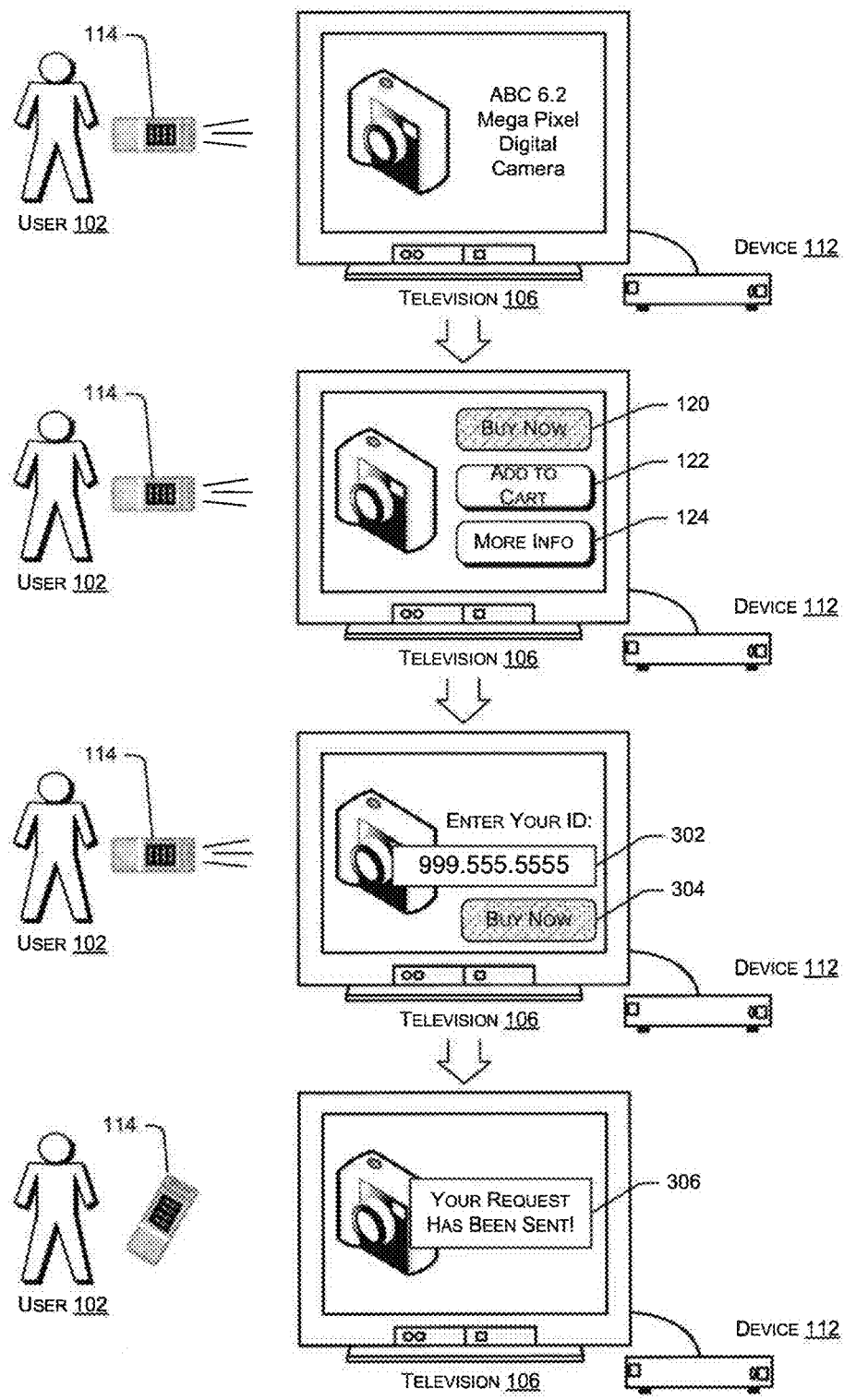
FIG. 3 illustrates a series of example user interfaces (UIs) that may be displayed on the television of FIG. 1 as the user requests to purchase an item displayed on the television.
Figure 4:
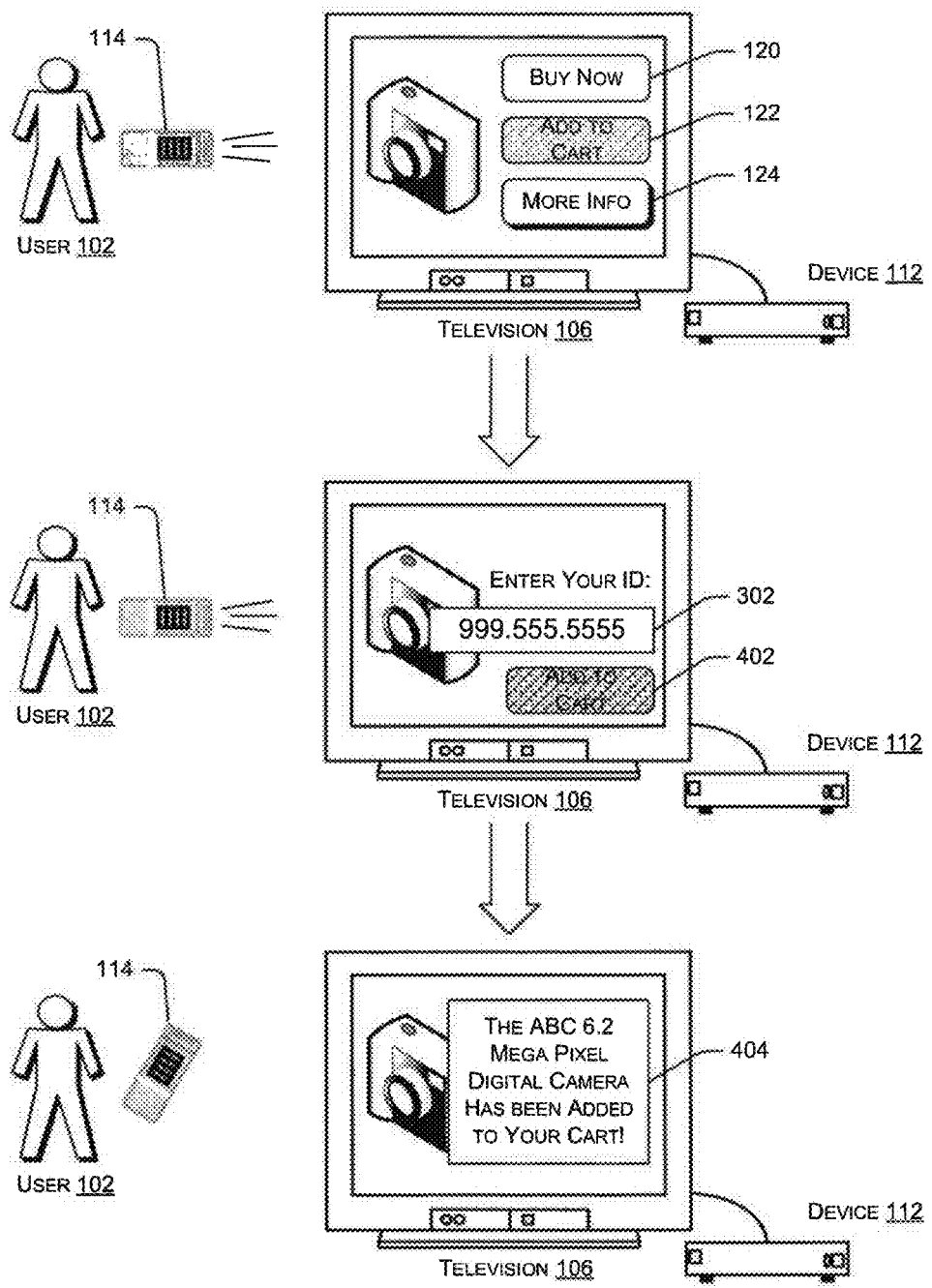
FIG. 4 illustrates a series of example user interfaces (UIs) that may be displayed on the television of FIG. 1 as the user requests to add an item displayed on the television to a shopping cart associated with the requesting user. In some instances, the item offering service of FIG. 1 maintains the shopping cart of the user.
Figure 5:
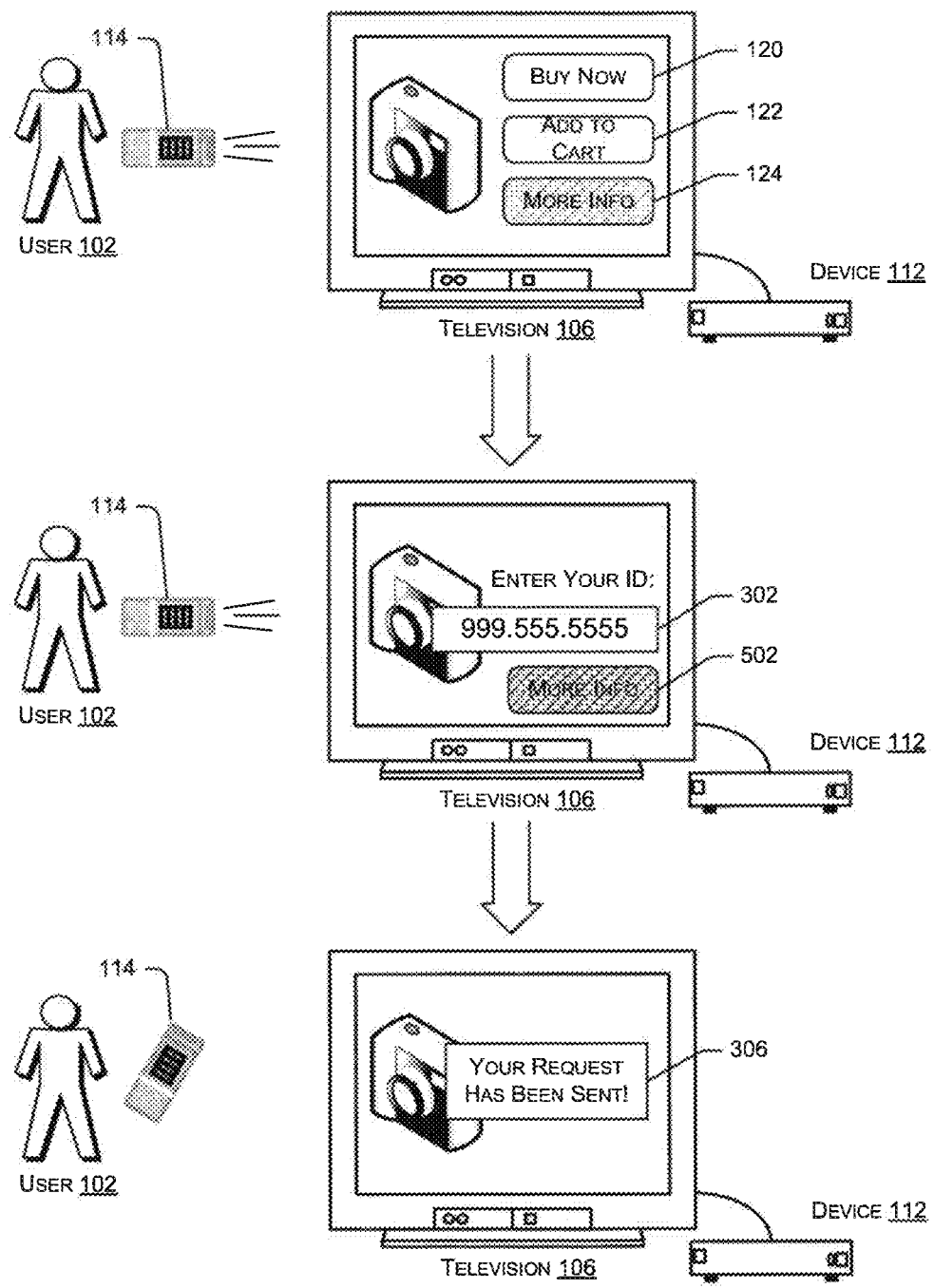
FIG. 5 illustrates a series of example user interfaces (UIs) that may be displayed on the television of FIG. 1 as the user requests information regarding an item displayed on the television.

While this example describes purchasing the illustrated item, user 102 may request to take other actions regarding the item. For instance, user 102 may request that offering service 116(M) add the illustrated digital camera to a shopping cart of the user. In response, offering service 116(M) may add the camera to shopping cart 240 and may send a message indicating as much to user 102. Alternatively, user 102 may request that offering service 116(M) provide additional information about the camera to user 102. In response, offering service may locate this information from electronic catalog 218 and may provide this additional information to user 102. FIGS. 3-5, discussed immediately below, illustrate example user interfaces that may be used with the techniques described above. While the proceeding section illustrates and describes example interfaces, it is noted that the claimed techniques may be implemented with use of many other similar or different interfaces or otherwise.

Illustrative User Interfaces

FIG. 3 illustrates a series of example user interfaces (UIs) that may be displayed on display 104 of television 106 of FIGS. 1 and 2 as user 102 requests to purchase an item displayed on the television.

FIG. 3 first illustrates that the video stream being displayed on television 106 may include an advertisement for the "ABC 6.2 Mega Pixel Digital Camera." In response to seeing this item on display 104, user 102 may request to purchase or otherwise take some action regarding this item. For instance, user 102 may actuate a button on remote control 114 that sends a request to device 112.

In response, device 112 may cause display of an overlay on display 104 of television. In this example, the overlay includes icons 120, 122 and 124 as discussed above. As illustrated, user 102 next selects icon 120 (entitled "Buy Now" in this example) and, in response, device 112 presents a new overlay that facilitates entry of an identifier associated with user 102 (or with another user if user 102 desires another user to purchase the item). As discussed above, user 102 may enter any sort of identifying information, such as the user's name, mobile phone number, email address, user account name at offering service 116(M), etc. In some instances, the device stores different options for the user to select from. For instance, the device may store the identifiers of users that have previously made requests via the device. The user is then able to, for example, select "1" for a first identified user, "2" for a second identified user and so forth.

As illustrated in FIG. 3, this example overlay includes a text box 302 and an icon 304 that, when selected, submits that request to initiate the purchase to the device, which passes this information on to offering service 116(M). Here, user 102 has entered a mobile phone number of user 102 into text box 302. While FIGS. 3-5 illustrate that user 102 enters his or her identifying information via text box 302, device 112 may facilitate entry of these identifiers audibly or via other techniques in other instances.

After user 102 enters the mobile phone number of the user and selects icon 304, device 112 causes display of an indication 306 that informs user 102 that the device has sent the request to offering service 116(M). At this point, offering service 116(M) may receive the request, identify the item and the user, and may contact the user via a different communication channel for the purpose of completing the transaction. For instance, the offering service 116 may send an SMS text message to the user's mobile phone number to allow user 102 to approve or deny purchase of the camera.

FIG. 4 illustrates a series of example user interfaces (UIs) that may be displayed on display 104 of television 106 of FIGS. 1 and 2 as the user requests to add an item displayed on the television to a shopping cart associated with the user. To do so, the user first makes a request (e.g., via remote control 114 or otherwise) to take some action regarding the illustrated camera, and then selects icon 122 ("Add to Cart"). In response, device 112 again allows user to enter an identifier of the user, before selecting an icon 402 to "Add [the item] to [the user's] Cart." Again, the device 112 then sends the request to offering service 116(M), which adds the identified camera to the shopping cart of the identified user. Device 112 then may display a confirmation message 404 to user 102, although it need not. In some instances, offering service 116(M) may also send a message to user 102 indicating that offering service 116(M) has indeed added the camera to the shopping cart of the user.

FIG. 5 illustrates a series of example user interfaces (UIs) that may be displayed on display 104 of television 106 of FIGS. 1 and 2 as user 102 requests information regarding an item displayed on the television. Here, the user selects to receive "more information" regarding the illustrated camera by selecting icon 124. In response, device 112 again allows user 102 to enter his or her identifying information before selecting an icon 502 to submit the request. Device 112 then sends the request to offering service 116(M), which then identifies the item and the user, before locating the requested information and sending a message with this information to user 102. For instance, in the illustrated example, offering service 116(M) may send information regarding the ABC Digital Camera via an email to an email address associated with user, via an SMS text message to the user's mobile phone number, or the like.

Illustrative Flow Diagram

Figure 6:
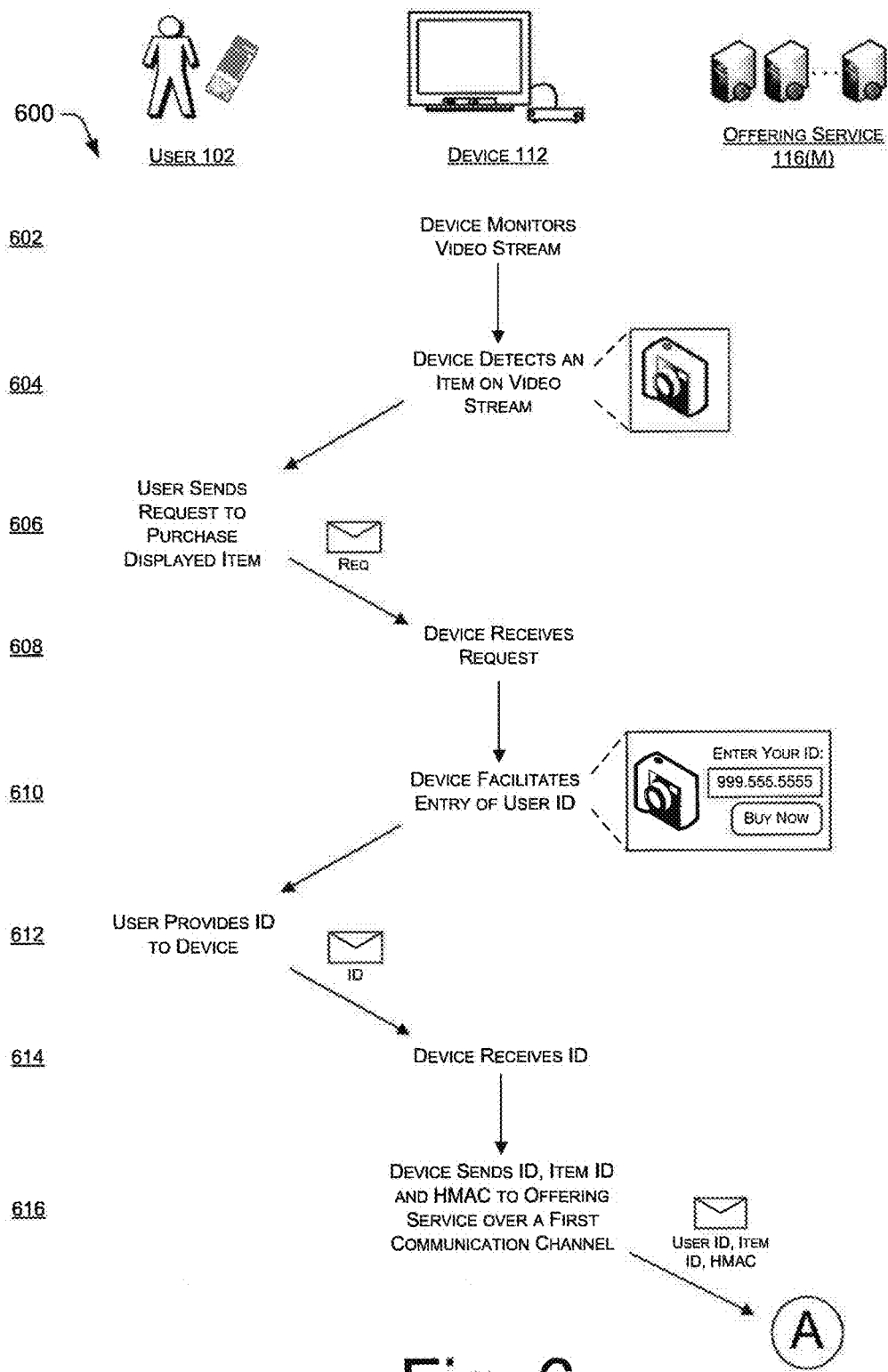
FIGS. 6-8 illustrate an example flow diagram of a process for fulfilling a user's request to purchase an item displayed on a television.
Figure 7:
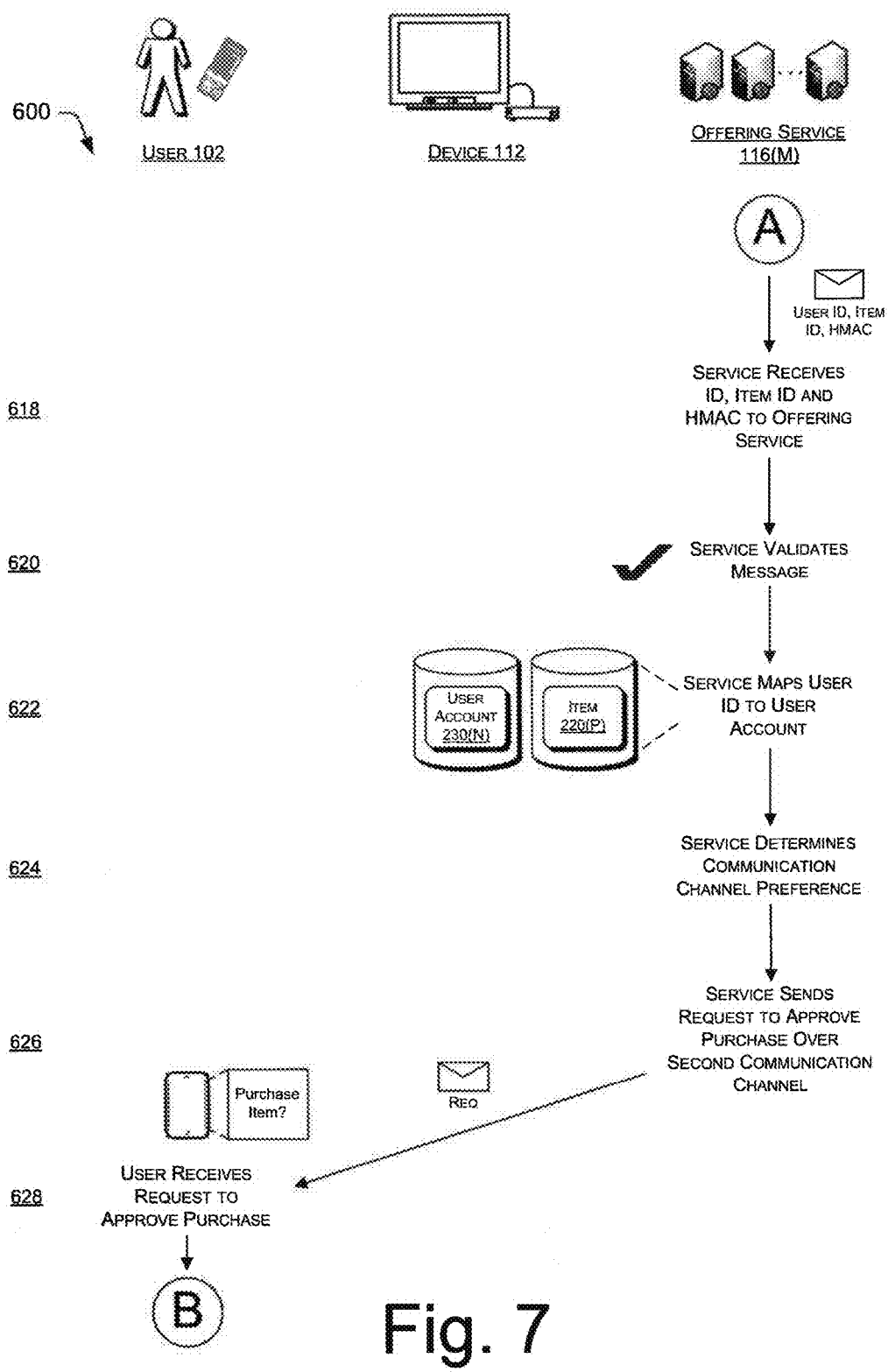
Figure 8:
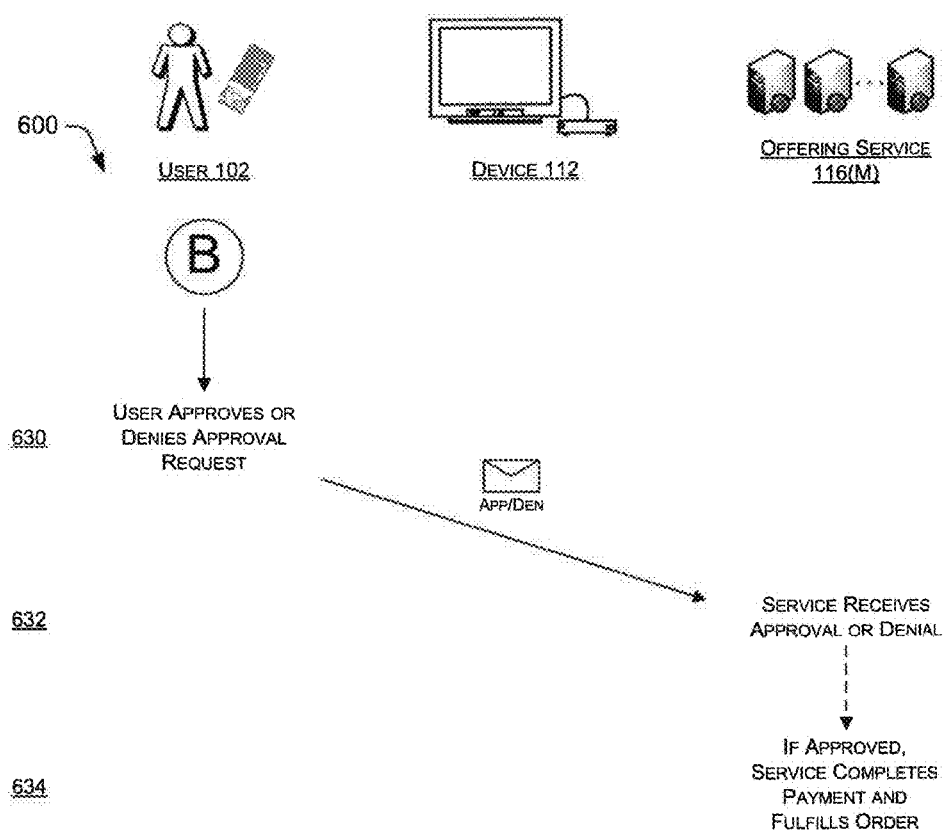

FIGS. 6-8 illustrate an example flow diagram of a process 600 for fulfilling a user's request to purchase an item displayed on a television. While this example describes user 102 purchasing an illustrated item, similar techniques may apply in instances where the user requests to add the item to a shopping cart of the user, to receive additional information regarding the item or take any other action regarding the displayed item.

Process 600 includes operation 602, at which device 112 monitors a video stream being displayed by a television. Again, device 112 may comprise a set-top box, a game console, an integral portion of the television or any other device capable of monitoring a displayed video stream to locate an item, as discussed above. At 604, device 112 detects an item on the video stream. Again, detecting an item may comprise detecting an item that appears within an electronic catalog of items maintained by one or more offering services. At 606, user 102 sends a request to device 112 to initiate purchase of the displayed item. In some instances, user 102 first sends the request, which then initiates the monitoring of the video stream and the detecting of the item by device 112.

In either instance, at 608, device 112 receives the request and, at 610, device 112 facilitates entry of a user identifier associated with user 102. For instance, device 112 may cause display of an overlay on the video stream that allows user 102 to provide identifying information. At 612, user 102 provides an identifier to device 112, which receives this information at 614. At 616, device 112 communicates the user identifier, the item identifier and, potentially, an HMAC or the like to an offering service over a first communication channel.

FIG. 7 continues the illustration of process 600. Here, offering service receives the user identifier, the item identifier and an HMAC at 618. At 620, offering service 116(M) validates the message with reference to the received HMAC. Next, at 622, offering service 116(M) maps the received user identifier to a unique user account within database 228 and maps the received item identifier to one or more unique items within electronic catalog 218. At 624, offering service 116(M) determines a communication channel preference of user 102 with reference to the identified user account of the user.

At 626, the offering service sends a request to approve the purchase of the item to user 102 over a preferred communication channel that differs from the communication channel by which the user initially made the request and that differs from the communication channel by which device 112 sent the request to service 116(M). For instance, offering service 116(M) may send the request via an SMS or MMS text message, via an email, via a message to a user account of the user at the offering service, via an IVR phone call or in any other manner. However, this approval request is not sent through device 112 and television 106 in some instances. At 628, the user receives the approval request.

FIG. 8 continues the illustration of process 600 and includes, at 630, user 102 approving or denying the approval request. At 632, offering service 116(M) receives the approval or denial and, in the former instances, completes payment for the item and fulfills the order at 634. For instance, the offering service may charge a payment instrument of user 102 and may initiate delivery of the item to the user with reference to a shipping address of the user and a preferred shipping method and speed of the user. As discussed above, the user account of user 102 at offering service 116(M) stores each of these pieces of information. In instances where the purchased item is a physical good, offering service 116(M) may initiate delivery of the item to a specified physical shipping address of the user. In instances where the purchased item is a digital good, meanwhile, offering service 116(M) may initiate delivery of the item to a specified digital location of the user.

Illustrative Processes

Figure 9:
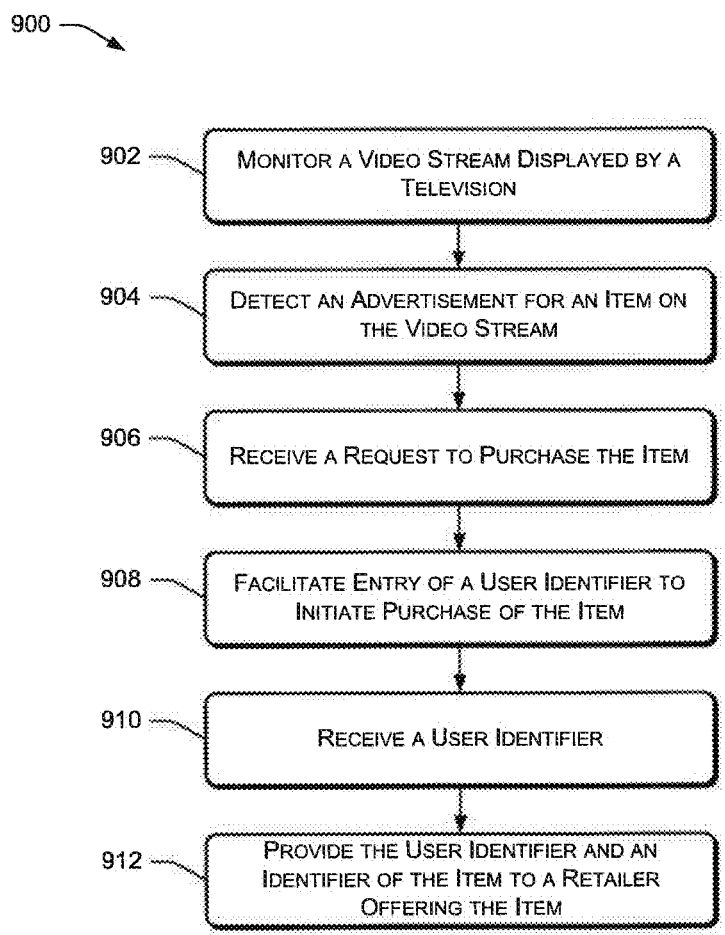
FIG. 9 illustrates an example process that the device of FIG. 1 may implement for enabling the user to request to initiate a purchase of an item displayed on the television of FIG. 1.
Figure 10:
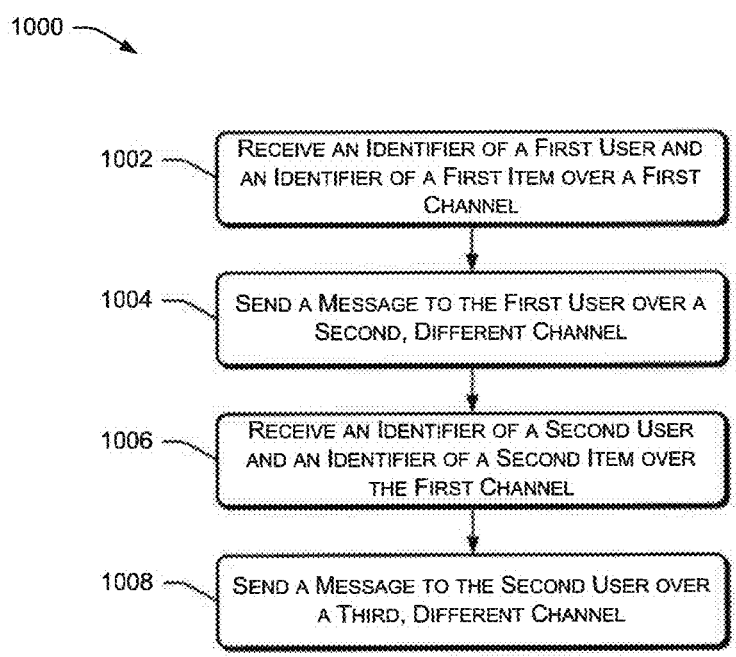
FIG. 10 illustrates an example process that an item offering service of FIG. 1 may implement in response to receiving multiple requests from multiple different users regarding items displayed on the television of FIG. 1.

FIGS. 9-10 illustrate example processes 900 and 1000 for implementing the techniques described above. While these processes are described with reference to the architectures discussed above, the described techniques may be equally applicable in many other architectures and environments. Furthermore, the described processes can be implemented in hardware, software, or a combination thereof. In the context of software, the illustrated operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Device 112, coupled to television 106 of FIG. 1, may implement process 900 in some instances. Process 900 includes monitoring, at 902, a video stream being displayed by a television. At 904, device 112 detects an advertisement for an item on the displayed video stream. At 906, the device receives a request to purchase the item, possibly from user 102 as discussed above. In response, device 112 facilitates entry of an identifier of a user to initiate purchase of the item at 908. At 910, device 112 receives an identifier of a user, such as an email address, a mobile phone number, a user account name, etc. Finally, at 912, device 112 provides the user identifier and an identifier of the item to a retailer that offers the item for sale.

FIG. 10 illustrates process 1000, which offering service 116(M) of FIGS. 1 and 2 may implement in some instances. This process includes receiving, at 1002, an identifier of a first user and an identifier of a first item over a first communication channel from a device that is coupled to a television and that monitors a video stream being displayed by the television. For instance, offering service 116(M) may receive an identifier of user 102 and an identifier of the illustrated digital camera from device 112. Next, at 1004, offering service 116(M) sends a message to the first user regarding the first item over a second communication channel that differs from the first communication channel. For instance, offering service 116(M) may send such a message to the first user via a text message, an email, a message to a user account of the user or the like. This message may comprise a request to approve a purchase of the item, a notification that the item has been added to a shopping cart of the user, information regarding the item or the like.

At 1006, offering service 116(M) receives an identifier of a second user and an identifier of a second item over the first communication channel from the same device that is coupled to a television and that monitors a video stream being displayed by the television. Stated otherwise, the offering service may receive an identification of a different user via the same device coupled to the same television. For instance, two different users may request to initiate purchases of two different items while consuming the same video stream on the television.

At 1008, the offering service 116(M) sends a message to the second user regarding the second item over a third communication channel that differs from the first and second communication channels. For instance, this channel may comprise a communication channel that is unique to the second user, such as via a text message to a mobile phone of the second user, an email to an email address of the second user, and the like. Again, this message may comprise a request to approve a purchase of the item, a notification that the item has been added to a shopping cart of the user, information regarding the item or the like.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A device comprising:
at least one physical processor; and
one or more memory devices to store computer instructions that, when executed by the at least one physical processor, cause the at least one physical processor to:
receive, from a content provider, a content stream, the content stream including content depicting an item;
provide the content stream to a display device associated with a user;
detect the item within the content stream;
analyze one or more visual elements of one or more images of the content stream with respect to a catalog of items to identify one or more characteristics of the item;
analyze one or more audio elements of the content stream to identify at least one of the one or more characteristics of the item, the one or more audio elements different than part of an advertisement;
determine an identification of a first catalog item that corresponds to the item within the catalog of items based at least in part on the one or more characteristics of the item;
determine an identification of a secondary catalog item that is similar to the item based at least in part on the one or more characteristics of the item, the secondary catalog item having at least one additional different functionality than the item;
receive a request regarding the first catalog item, the request regarding the first catalog item including first audio input from the user, the first audio input corresponding to a transaction phrase token spoken by the user;

receive identification information of the user, wherein the identification information of the user includes the transaction phrase token that is assigned a transaction rule to automatically approve purchase requests for items that belong to an item type for a certain account and to automatically approve shipment of the first catalog item to a first shipping address associated with the certain account;

transmit, to one or more item offering services, the identification of the first catalog item, the identification of the secondary catalog item, and the identification information of the user; and receive a second request regarding the secondary catalog item, the second request including second audio input from a second user, the second audio input corresponding to a second transaction phrase token spoken by the second user, and wherein the second transaction phrase token is usable to authorize a purchase of the secondary catalog item without user access to billing information associated with a second account corresponding to the second transaction phrase token and to automatically approve shipment of the secondary catalog item to a second shipping address associated with the second account.

2. The device as recited in claim 1, wherein the user is a first user, wherein the first user is one of a plurality of users and at least some of the plurality of users have no association with the content provider, and wherein the computer instructions that, when executed by the at least one physical processor, further cause the at least one physical processor to:

based at least partly on a third user of the some of the plurality of users having no association with the content provider, query the third user for additional information, wherein the first user is not queried for the additional information.

3. The device as recited in claim 1, wherein the computer instructions that, when executed by the at least one physical processor, further cause the at least one physical processor to send a request to a third user to identify the item.

4. The device as recited in claim 1, wherein the identification of the first catalog item comprises at least one of a stock-keeping unit (SKU) of the first catalog item or a universal product code (UPC) of the first catalog item.

5. The device as recited in claim 1, wherein the computer instructions that, when executed by the at least one physical processor, further cause the at least one physical processor to:

receive second identification information of the second user, the second identification information of the second user including the second transaction phrase token; and transmit, to the one or more item offering services, the second identification information of the second user.

6. A computer-implemented method comprising:
performing by one or more processors of a client device,
receiving a content stream from a content provider, the content stream including images of one or more items;
detecting, based at least in part on an image analysis of one or more of the images, a detected item of the one or more items within the content stream;

identifying, based at least in part on the image analysis of the one or more of the images, item identification information for the detected item from a catalog of items;

receiving a request regarding the detected item;

determining, based at least partly on the detected item, a secondary item that is similar to the detected item, the secondary item having at least one different functionality and more positive ratings than the detected item;

identifying item identification information for the secondary item; and creating a modified content stream by modifying the content stream to include an overlay of a user interface, the user interface allowing receipt of an additional request for the detected item and the secondary item;

providing the modified content stream to a display device associated with a user;

determining, based at least partly on the item identification information of the detected item, an item offering service from among a plurality of item offering services;

receiving a user identification, wherein the user identification includes a phrase token used to automatically approve purchase requests for items identified in relation to the content stream that belong to an item type; and transmitting, to the item offering service, the item identification information for the detected item, the item identification information for the secondary item, and the user identification.

7. The computer-implemented method of claim 6, wherein the item offering service is a first item offering service, and wherein the computer-implemented method further comprises:

determining, based at least partly on the item identification information of the detected item, a second item offering service from among the plurality of item offering services; and transmitting, to the second item offering service, the item identification information for the detected item.

8. The computer-implemented method as recited in claim 6, further comprising:

receiving audio input from the user in response to query elements of the user interface being displayed on the display device, the audio input comprising the phrase token corresponding to the user.

9. The computer-implemented method as recited in claim 6, further comprising:

receiving audio input from the user in response to query elements of the user interface being displayed on the display device, the audio input comprising the phrase token spoken by the user, and wherein the phrase token is further used to authorize purchase of the detected item without user access to billing information corresponding to an account corresponding to the phrase token and to automatically approve shipment of the detected item to a first shipping address associated with the account; and receiving second audio input from a second user in response to the query elements of the user interface being displayed on the display device, the second audio input comprising a second phrase token corresponding to the second user and spoken by the second user, and wherein the second phrase token is used to authorize purchase of the secondary item without user access to second billing information corresponding to a second account corresponding to the second phrase token and to automatically approve shipment of the secondary item to a second shipping address associated with the second account.

10. The computer-implemented method as recited in claim 6, further comprising:
    determining, based at least partly on the detected item, one or more accessories for the detected item; and
    offering at least one of the one or more accessories for the detected item through the user interface for purchase.

11. The computer-implemented method as recited in claim 6, further comprising:
    determining, without regard to what the detected item is, a seller that offers multiple different items; and
    transmitting the user identification and the item identification information for the detected item to the seller.

12. The computer-implemented method of claim 6, further comprising sending a request to the user to identify the detected item.

13. The computer-implemented method of claim 6, wherein the content stream is a video stream for a show, and wherein the overlay of the user interface occurs after a completion of display of the show.

14. One or more computer-readable storage devices storing instructions that, when executed, cause one or more processors to perform operations comprising:
    displaying a content stream from a content provider, the content stream including images that include one or more items;
    determining item identification information for the one or more items, based at least partly from an image analysis of at least one of the images, by associating the one or more items to a catalog of items;
    receiving a request initiating a purchase of a selected item depicted within the content stream;
    determining, based at least partly on the selected item, one or more secondary items that is similar to the selected item, the one or more secondary items having at least one different functionality and more positive ratings than the selected item;
    in response to the request, overlaying a user interface onto a display of the content stream;
    offering the selected item and at least one of the one or more secondary items through the user interface for purchase;
    receiving, through the user interface, user identification information corresponding to a user and receiving a transaction option related to the selected item, wherein the user identification information includes a transaction phrase token, and the transaction phrase token being assigned a transaction rule to automatically approve purchase requests for items that belong to an item type for a certain account; and
    transmitting, to an offering service, the user identification information corresponding to the user, item identification information for the selected item, and the transaction option.

15. The one or more computer-readable storage devices of claim 14, the operations further comprising:
    determining that the selected item belongs to the item type; and
    causing the offering service to complete the transaction option related to the selected item without additional user approval, based at least in part on the transaction rule, in response to the transmitting the user identification information corresponding to the user and transmitting the item identification information for the selected item.

16. The one or more computer-readable storage devices of claim 14, the operations further comprising:
    determining the transaction option is a request for additional information about the selected item;
    transmitting, to the offering service, a request for information about the selected item; and
    displaying, in response to receiving the information about the selected item from the offering service, some or all of the additional information about the selected item.

17. The one or more computer-readable storage devices of claim 14, wherein the user interface includes one or more items selected by the user during a display of a show.

18. The one or more computer-readable storage devices of claim 14, the operations further comprising sending a request to the user to identify the selected item.

19. The one or more computer-readable storage devices of claim 14, the operations further comprising:
    analyzing one or more audio elements of the content stream to identify one or more characteristics of the one or more items, the one or more audio elements not being part of an advertisement; and
    based at least partly on the one or more characteristics of the one or more items, correlate the one or more items to at least one catalog item within the catalog of items.

* * * * *